United States Patent
Tian et al.

(10) Patent No.: US 9,299,128 B2
(45) Date of Patent: Mar. 29, 2016

(54) DELTA INTERPOLATION FOR UPSAMPLING IMAGING SOLUTION

(71) Applicant: Futurewei Technologies, Inc., Plano, TX (US)

(72) Inventors: Jun Tian, Belle Mead, NJ (US); Wenjun Zeng, Plano, TX (US)

(73) Assignee: Futurewei Technologies, Inc., Plano, TX (US)

(*) Notice: Subject to any disclaimer, the term of this patent is extended or adjusted under 35 U.S.C. 154(b) by 0 days.

(21) Appl. No.: 14/286,091

(22) Filed: May 23, 2014

(65) Prior Publication Data
US 2014/0348425 A1  Nov. 27, 2014

Related U.S. Application Data

(60) Provisional application No. 61/826,841, filed on May 23, 2013.

(51) Int. Cl.
*G06T 3/00* (2006.01)

(52) U.S. Cl.
CPC ..... *G06T 3/0093* (2013.01); *G06T 2207/20012* (2013.01)

(58) Field of Classification Search
None
See application file for complete search history.

(56) References Cited

U.S. PATENT DOCUMENTS

| | | | | |
|---|---|---|---|---|
| 5,796,879 | A * | 8/1998 | Wong et al. | 382/300 |
| 6,618,443 | B1 * | 9/2003 | Kim et al. | 375/240.21 |
| 6,804,392 | B1 * | 10/2004 | Adams et al. | 382/167 |
| 6,937,772 | B2 * | 8/2005 | Gindele | 382/240 |
| 8,514,302 | B2 * | 8/2013 | Utsugi | 348/241 |
| 2002/0076121 | A1 * | 6/2002 | Shimizu et al. | 382/300 |
| 2005/0074163 | A1 * | 4/2005 | Shaked | 382/162 |
| 2010/0166334 | A1 * | 7/2010 | Zhang et al. | 382/263 |

OTHER PUBLICATIONS

Palma-Amestoy, R., et al., "A Perceptually Inspired Variational Framework for Color Enhancement," IEEE Computer Society, IEEE Transactions on Pattern Analysis and Machine Intelligence, vol. 31, No. 3, Mar. 2009, pp. 458-474.

Provenzi, E., et al., "A Spatially Variant White-Patch and Gray-World Method for Color Image Enhancement Driven by Local Contrast," IEEE Computer Society, IEEE Transactions on Pattern Analysis and Machine Intelligence, vol. 30, No. 10, Oct. 2008, pp. 1757-1770.

Xiong, Z., et al., "Fast Directional Image Interpolation with Difference Projection," ICEE 2009, IEEE, pp. 81-84.

* cited by examiner

*Primary Examiner* — Sumati Lefkowitz
*Assistant Examiner* — Jiangeng Sun
(74) *Attorney, Agent, or Firm* — Conley Rose, P.C.; Grant Rodolph; William H. Dietrich

(57) ABSTRACT

An apparatus comprising one or more processors configured to process a first image at a first resolution to generate a first solved image at the first resolution, determine a difference between the first solved image and a function of the first image, and generate a second solved image at a second resolution higher than the first resolution based at least in part on the difference between the first solved image and the function of the first image.

15 Claims, 9 Drawing Sheets

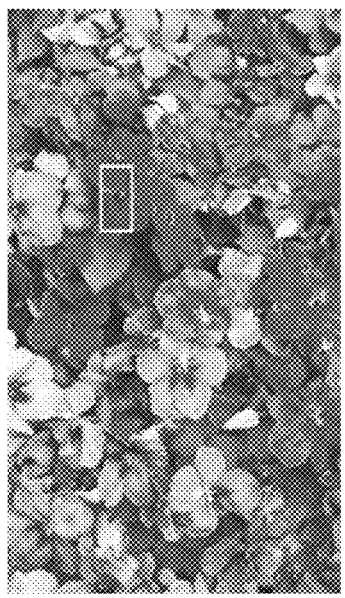
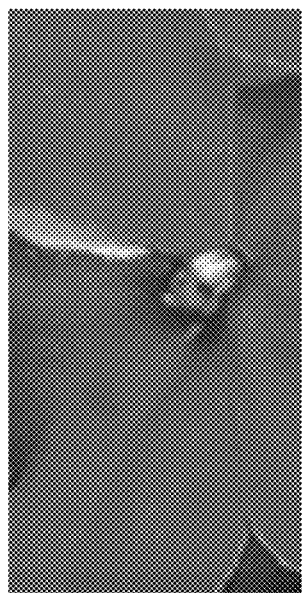
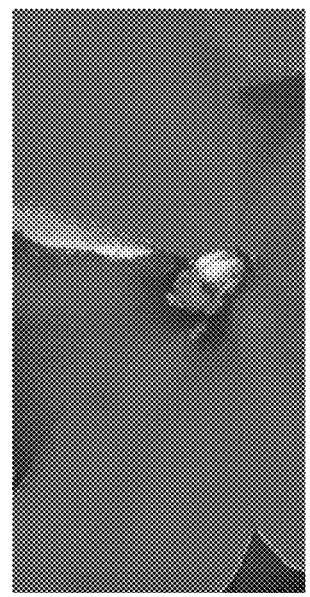
FIG. 7A    FIG. 7B    FIG. 7C
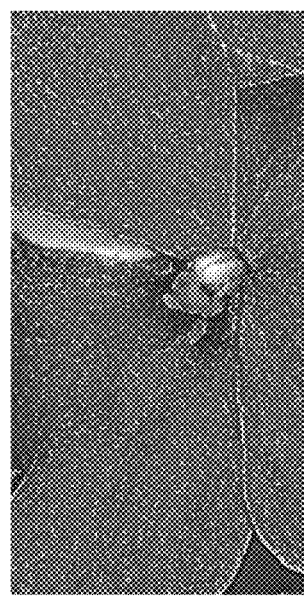
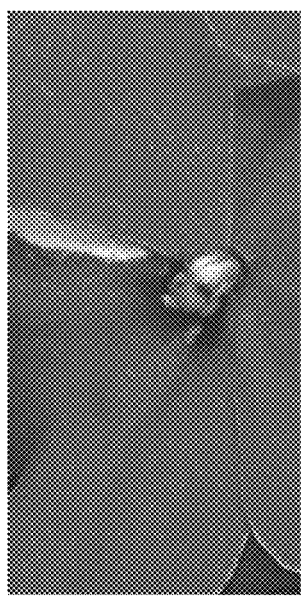
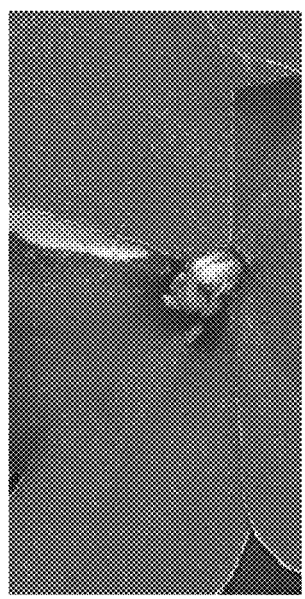
FIG. 7D    FIG. 7E    FIG. 7F

DELTA INTERPOLATION FOR UPSAMPLING IMAGING SOLUTION

CROSS-REFERENCE TO RELATED APPLICATIONS

The present application claims benefit of U.S. Provisional Patent Application No. 61/826,841 filed May 23, 2013 by Jun Tian, et al. and entitled "Delta Interpolation for Upsampling Imaging Solution," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Technological advances in imaging optics, sensors, and camera processing capabilities in today's digital cameras have resulted in high definition images or photos (e.g., those with over 10 megapixels). High resolution images may pose a challenge to imaging solutions in terms of computational complexity. For example, the complexity of an original Retinex-based color enhancement process may be on the order of N squared ($O(N^2)$), where N is a number of input pixels. To reduce the complexity of imaging solutions and enable real-time operations, an upsampling imaging solution was proposed. The upsampling imaging solution approach may downsample an image from an original resolution to a low resolution, solve for the solution on the low resolution image, and then upsample the low resolution solution to the original resolution.

Meanwhile, upsampling imaging solutions may be applied to other scenarios where a low resolution solution and a high resolution image are available. For example, a KINECT sensor may give a depth image with a resolution of 640×480, while its Red Green Blue (RGB) camera may be capable of producing RGB images with a resolution of 1280×1024. Hence, it may be desirable to utilize the high resolution RGB image to construct a depth image with resolution of 1280×1024. Traditional upsampling methods may interpolate a low resolution solution directly and ignoring the knowledge of a high resolution image to a large extent, thereby thus sacrificing visual quality.

SUMMARY

In one embodiment, the disclosure includes an apparatus comprising one or more processors configured to process a first image at a first resolution to generate a first solved image at the first resolution, determine a difference between the first solved image and a function of the first image, and generate a second solved image at a second resolution higher than the first resolution based at least in part on the difference between the first solved image and the function of the first image.

In another embodiment, the disclosure includes a method of image processing comprising processing a low resolution image to generate a low resolution solution, generating a delta image based on the low resolution solution and a function of the low resolution image, generating a high resolution solution based at least in part on the delta image.

In yet another embodiment, the disclosure includes a computer program product comprising computer executable instructions stored on a non-transitory computer readable medium such that when executed by a processor cause an image processing device to downsample an original resolution image to generate a low resolution image having a resolution lower than that of the original resolution image, process the low resolution image to generate a low resolution solution, construct a delta image that represents a difference between the low resolution solution and a function of the low resolution image, upsample the delta image to generate an upsampled delta image via interpolation, and generate an original resolution solution by combining the original resolution image and the upsampled delta image.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 7A-7F illustrate a subjective visual quality comparison among four upsampling imaging solution algorithms for color enhancement.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments for improving upsampling imaging solutions by using delta interpolation. Unlike most existing upsampling imaging solution algorithms that operate directly on a low resolution solution, embodiments disclosed herein may reconstruct a high resolution solution by explicitly employing knowledge from both high and low resolution images and operating on a delta image space. In a specific example, an original resolution image may be downsampled to obtain a low resolution image, which in turn may be processed (using any suitable image processing techniques such as color enhancement, in-depth mapping, etc.) to generate a low resolution solution. Then, a delta image may be computed to represent a difference between the low resolution solution and a function of the low resolution image. The delta image may be upsampled to generate an upsampled delta image, which may then be combined with the original resolution image to generate an original resolution solution. Experimental results verify that the disclosed delta interpolation embodiments may enhance visual quality of image solutions over existing techniques including the bilateral interpolation approach. The delta image-based approach may be used in media processing engines of various devices such as mobile electronic devices (e.g., smartphones and tablets) whose processing power may be constrained.

Figure 1:
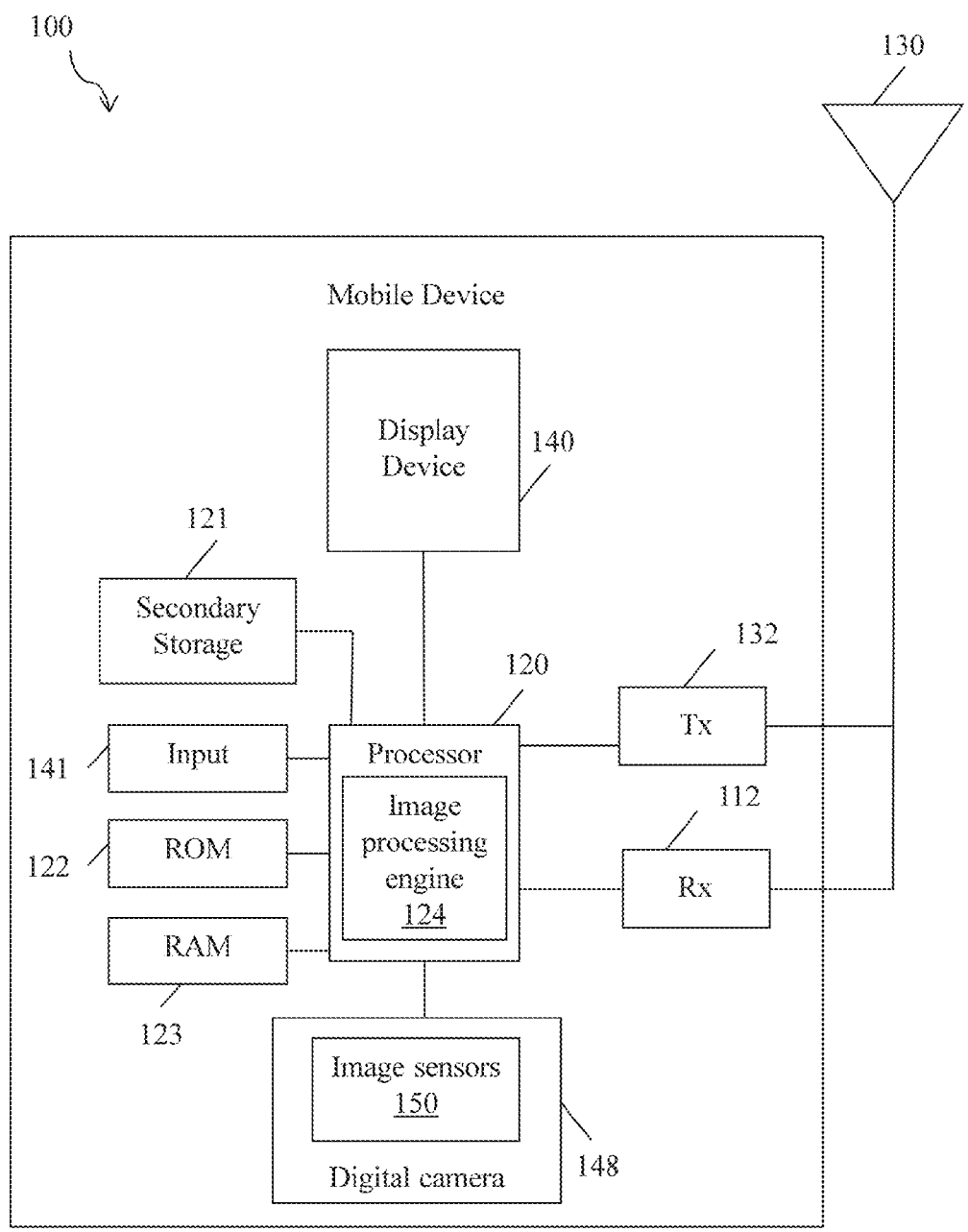
FIG. 1 is a schematic diagram of an embodiment of a mobile device.

Embodiments disclosed herein may be implemented on any suitable electronic device or computer system, such as a mobile device, that is capable of processing digital images. FIG. 1 illustrates an embodiment of a mobile device 100. The mobile device 100 may comprise a two-way wireless communication device having voice and data communication capabilities. In some aspects, voice communication capabilities are optional. The mobile device 100 generally has the capability to communicate with other computer systems on the Internet. Depending on the exact functionality provided, the mobile device 100 may be referred to as a data messaging device, a two-way pager, a wireless e-mail device, a cellular telephone with data messaging capabilities, a wireless Internet appliance, a wireless device, a smartphone, a mobile device, or a data communication device, as examples.

The mobile device 100 may comprise a processor 120 (e.g., a central processor unit (CPU)) that is in communication with memory devices including secondary storage 121, read only memory (ROM) 122, and random access memory (RAM) 123. The processor 120 may be implemented as one or more CPU chips, one or more cores (e.g., a multi-core processor), or may be part of one or more application specific integrated circuits (ASICs) and/or digital signal processors (DSPs). The processor 120 may be configured to implement any of the schemes described herein, and may be implemented using hardware, software, firmware, or combinations thereof. In an embodiment, the processor 120 may comprise an image processing engine 124 configured to process various images or video frames.

The secondary storage 121 may be comprised of one or more solid state drives, disk drives, and/or other memory types and is used for non-volatile storage of data and as an over-flow data storage device if RAM 123 is not large enough to hold all working data. Secondary storage 121 may be used to store programs that are loaded into RAM 123 when such programs are selected for execution. The ROM 122 may be used to store instructions and perhaps data that are read during program execution. ROM 122 may be a non-volatile memory device and may have a small memory capacity relative to the larger memory capacity of secondary storage 121. The RAM 123 may be used to store volatile data and perhaps to store instructions. Access to both ROM 122 and RAM 123 may be faster than to secondary storage 121.

The mobile device 100 may communicate data (e.g., packets) wirelessly with a network. As such, the mobile device 100 may comprise a receiver (Rx) 112, which may be configured for receiving data (e.g. Internet Protocol (IP) packets or Ethernet frames) from other components. The receiver 112 may be coupled to the processor 120, which may be configured to process the data and determine to which components the data is to be sent. The mobile device 100 may also comprise a transmitter (Tx) 132 coupled to the processor 120 and configured for transmitting data (e.g. the IP packets or Ethernet frames) to other components. The receiver 112 and the transmitter 132 may be coupled to an antenna 130, which may be configured to receive and transmit wireless radio frequency (RF) signals.

The mobile device 100 may also comprise a display device 140 coupled to the processor 120, for displaying output thereof to a user. The mobile device 100 and the display device 140 may be configured to accept a blended image, as discussed below, and display it to a user. The display device 140 may comprise a Color Super Twisted Nematic (CSTN) display, a thin film transistor (TFT) display, a thin film diode (TFD) display, an organic light-emitting diode (OLED) display, an active-matrix organic light-emitting diode (LED) display, or any other display screen. The display device 140 may display in color or monochrome and may be equipped with a touch sensor based on resistive and/or capacitive technologies. The mobile device 100 may further comprise an input device 141 coupled to the processor 120, which may allow the user to input commands to the mobile device 100. In the case that the display device 140 comprises a touch sensor, the display device 140 may also be considered the input device 141. In addition to and/or in the alternative, an input device 141 may comprise a mouse, trackball, built-in keyboard, external keyboard, and/or any other device that a user may employ to interact with the mobile device 100.

The mobile device 100 may further comprise a digital camera 148 coupled to the processor 120 and configured to capture images or videos. In an embodiment, the digital camera 148 may comprise one or more image sensors 150. For example, the image sensors 150 may be complementary metal-oxide semiconductor (CMOS) or charge-coupled device (CDD) image sensors that generate digital images and/or digital videos, and then send digital images to the processor 120. The mobile device 100 may comprise other types of sensors, which may detect conditions in and around the mobile device 100. It should be understood that embodiments for image filtering disclosed herein does not require a digital camera, so the mobile device 100 (or other types of device or system) may not need to have a digital camera 148 or image sensors 150. For example, the digital images may be received by the mobile device 100 from another device or from a network (e.g., the Internet) for processing by the processor 120.

Figure 2:
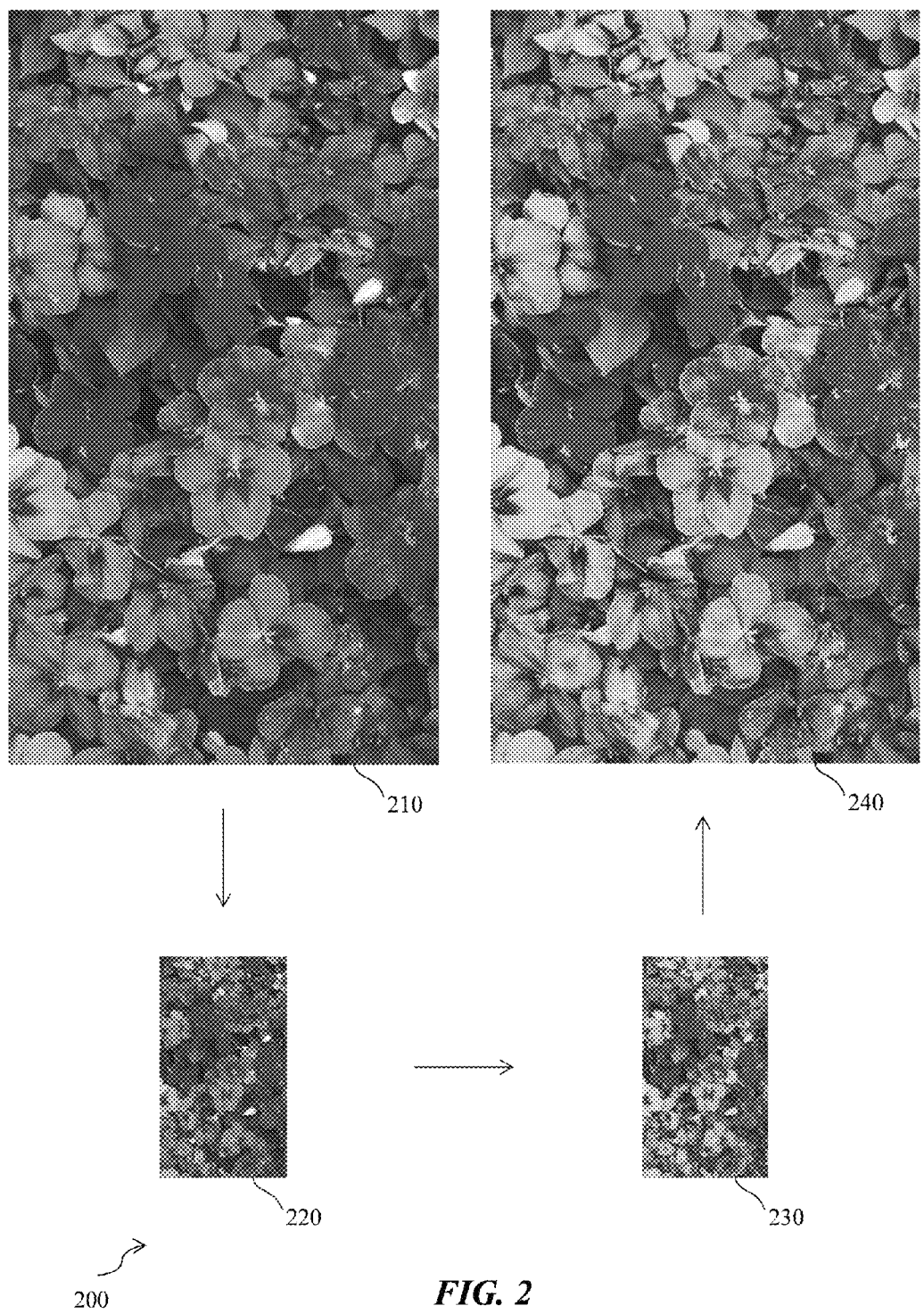
FIG. 2 illustrates an embodiment of an imaging solution process.

FIG. 2 illustrates an embodiment of an imaging solution process 200, in which the goal may be to derive a high resolution solution S 240 from a high resolution image I 210. The term "solution" when referring to an image herein may refer to a processed or solved image that has been processed using any suitable image processing technique(s). As discussed, it may be computationally costly when solving for the solution directly on the high resolution image. Instead, the imaging solution process 200 may first downsample the high resolution image I 210 to a low resolution image LI 220. Next, the imaging solution process 200 may solve for the solution on the low resolution image LI 220. Then, the imaging solution process 200 may reconstruct or approximate a high resolution solution S' from the low resolution solution LS 230, which is the imaging solution for the low resolution image LI 220. The target for the imaging solution process 200 may be to reconstruct a high resolution solution S' that is as close as possible to the high resolution solution S 240, under some measurement metric (such as a visual quality metric including preservation of edges and fine details).

Imaging solution, such as color enhancement, High Dynamic Range (HDR) tone mapping, colorization, and graph-cut based image operations, etc., may provide the best visual quality when the solution is solved directly on the original high resolution image. However, to lower the computational complexity in imaging solution, an upsampling imaging solution approach may be used instead, where the solution may be solved for at a lower resolution and then followed by reconstructing a high resolution solution from the low resolution solution. Existing techniques may not incorporate the knowledge of the original high resolution image to a large extent and thus sacrificing visual quality. For instance, traditional interpolation methods, such as bicubic interpolation and directional interpolation, may be used to reconstruct a high resolution solution from a low resolution solution. These techniques may not incorporate knowledge of the high resolution image, which may be used to determine the interpolation coefficients.

A bilateral interpolation approach was proposed to apply a bilateral filter to the low resolution solution, with a range filter on the high resolution image to influence the filter coefficients. This approach is also known as a joint bilateral upsampling technique. In the present disclosure, notational symbols I, LI, LS, S and S' are used to represent an original high resolution image, a low resolution image, a low resolution solution, a high resolution solution, and a reconstructed or approximated high resolution solution, respectively. Using bilateral interpolation, a reconstructed high resolution solution S' can be represented mathematically as:

$$S'(x) = \frac{1}{k_x} \sum_{y \in \Omega} f(x, y) g(I(x), I(y)) LS(y) \quad (1)$$

where x and y are pixel coordinates, $\Omega$ is a local window of x which may also be the entire image, f is a spatial filter kernel, g is a range filter kernel, I(x) and I(y) are pixel values of the high resolution image I at x and y, LS(y) is the low resolution solution at y, and $k_x$ is the normalization factor that can be expressed as:

$$k_x = \sum_{y \in \Omega} f(x, y) g(I(x), I(y)).$$

Bilateral interpolation may be edge-preserving. Taking account of the high resolution image, bilateral interpolation may produce images with better visual quality than some other traditional interpolations. However, despite being one of the best methods among traditional upsampling imaging solution techniques, bilateral interpolation approach still has its drawbacks that need to be improved on. For instance, when downsampling a high resolution image I to a low resolution image LI with a scaling factor such as two, the reconstructed solution S' in equation (1) may exhibit a blur-like effect.

For upsampling imaging solutions, such as traditional interpolation methods and joint bilateral upsampling, the interpolation may be applied directly on a low resolution solution LS. A reconstructed solution S' may be written in a generalized formula as below:

$$S'(x) = \frac{1}{k_x} \sum_{y \in \Omega} f(x, y, I(x), I(y)) LS(y) \quad (2)$$

where f is a generalized filter kernel depending on variables x, y, I(x), I(y), and $k_x$ is the normalization factor that can be expressed as:

$$k_x = \sum_{y \in \Omega} f(x, y, I(x), I(y)).$$

It can be observed from equation (2) that if the low resolution solution LS is equal to a constant c for some local region with coordinate x, then S'(x)=c. That is, the reconstructed solution S' may be rendered flat in this local region, even though the high resolution image I may not be flat in the same local region.

Figure 3:
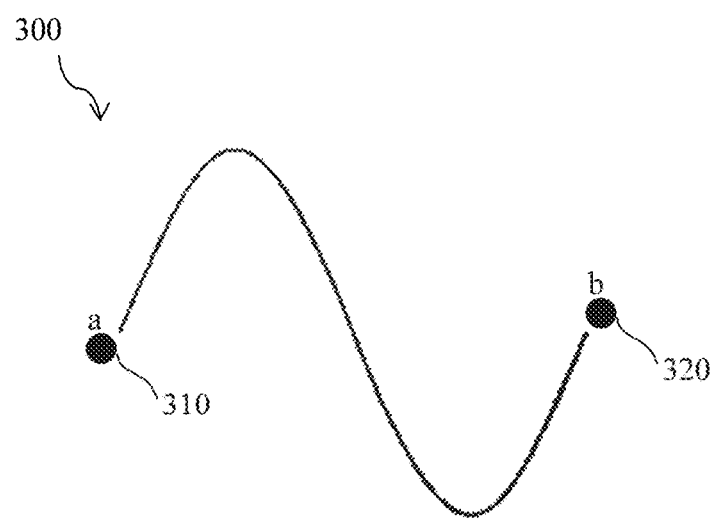
FIG. 3 is an exemplary curve representing part of an original high resolution image.

A simplified one dimensional setting may be used to further explain the flatness in a local region. FIG. 3 illustrates an exemplary curve 300 representing part of an original high resolution image I, which comprises a first point 310 at location a and a second point 320 at location b where I(a)=I(b). Assuming the low resolution curve contains just the two points a and b, and further assuming the low resolution solution at point a and point b are also equal, LS(a)=LS(b). Then, the reconstructed high resolution solution S'(x) in equation (3) may be expressed as S'(x)=LS(a)=LS(b) for all values of x between a and b. In other words, the reconstructed high resolution solution is flat between point a and point b for traditional interpolation methods including bilateral interpolation. Thus, a null solution may be resulted in this region, even though there is knowledge that the high resolution curve I may not be flat in the same region.

The present disclosure teaches embodiments of delta interpolation for upsampling an imaging solution, which may avoid the null solution and preserve fine details of the high resolution image to a large extent. The disclosed delta interpolation approach may first be explained in an one dimensional setting for the sake of simplicity. The goal is to reconstruct a high resolution solution S'(x) for all points of x between a and b, given a curve I from point a to point b, and values of an image solution LS at point a and point b. Mathematically, an interval [a, b] may be partitioned into N equal pieces or sub-intervals, $a=x_0<x_1<\ldots<x_N=b$, with $$x_{i+1} - x_i = \frac{b-a}{N},$$

for $0 \leq i < N$. Then, the following equations hold true:

$$I(b) - I(a) = I(x_N) - I(x_0) = \sum_{i=0}^{N-1} (I(x_{i+1}) - I(x_i)),$$

$$LS(B) - LS(a) =$$

$$S'(b) - S'(a) = S'(x_N) - S'(x_0) = \sum_{i=0}^{N-1} (S'(x_{i+1}) - S'(x_i)).$$

With (N−1) unknown variables S'(x) for $1 \leq i < N$, the system may be an undetermined system. In an embodiment, with a first order approximation, one of ordinary skill in the art may set the difference between $(S'(x_{i+1})-S'(x_i))$ and $(I(x_{i+1})-I(x_i))$ to be a constant c. The value of c may be solved as:

$$c=(S'(x_{i+1})-S'(x_i))-(I(x_{i+1})-I(x_i)) \quad (3)$$

Further, the terms on both sides of equation (3) may be summed up N times as follows:

$$\begin{aligned} Nc &= \sum_{i=0}^{N-1} ((S'(x_{i+1})-S'(x_i))-(I(x_{i+1})-I(x_i))) \quad (4) \\ &= S'(x_N)-S'(x_0)-I(x_N)+I(x_0) \\ &= LS(b)-LS(a)-I(b)+I(a) \end{aligned}$$

Thus, the value of c may be computed from equation (4) as:

$$c = \frac{LS(b)-LS(a)-I(b)+I(a)}{N} \quad (5)$$

Further, a given point $S'(x_j)$ may be expressed as:

$$\begin{aligned} S'(x_j) &= S'(x_0) + \sum_{i=0}^{j-1} (S'(x_{i+1})-S'(x_i)) \quad (6) \\ &= LS(a) + jc + \sum_{i=0}^{j-1} (I(x_{i+1})-I(x_i)) \\ &= LS(a) + I(x_j) - I(a) + jc \\ &= I(x_j) + LS(a) - I(a) + \frac{x_j-a}{b-a}((LS(b)-I(b))-(LS(a)-I(a))) \end{aligned}$$

Equation (6) may be re-formulated as:

$$S'(x_j)-I(x_j) = \frac{x_j-a}{b-a}(LS(b)-I(b)) + \frac{b-x_j}{b-a}(LS(a)-I(a)) \quad (7)$$

The discrete solution in equation (7) may be extended into a continuous solution as:

$$S'(x)-I(x) = \frac{x-a}{b-a}(LS(b)-I(b)) + \frac{b-x}{b-a}(LS(a)-I(a)) \quad (8)$$

One of ordinary skill in the art will recognize that the solution S' in equation (8) may be derived from an interpolation on $LS(\cdot)-I(\cdot)$. Since $I(a)=LI(a)$ in the illustrative case shown in FIG. 3, $LS(a)-I(a)=LS(a)-LI(a)$. Thus, the interpolation may be applied on $LS(\cdot)-LI(\cdot)$, which represents a difference between the low resolution solution LS and the low resolution image LI. Expanding on the one dimensional idea to two dimensions, interpolation algorithms may be designed to use a difference between a solution S and a function d of the image I (e.g., the difference=S−d(I)). In an embodiment, the function d may be any suitable function with relatively low computational complexity, such as a linear function or an identity function. Further, a delta image may be constructed as the difference between an image solution and some function d of the image at the same resolution. For the solution S' in Equation (8), the function d is the identity function, and an upsampled delta image at the original resolution is reconstructed by an interpolation of a delta image at the low resolution. An interpolation on a low resolution delta image to generate a high resolution delta image may be regarded herein as delta interpolation.

In an embodiment, a delta image may be defined jointly based on an image and its solution at the same resolution, e.g., to represent the difference between the two. Thus, a delta image at a high resolution may be reconstructed from an interpolation of a delta image at a low resolution. In this case, delta interpolation may be the interpolation of the low resolution delta image. Interpolation on the delta image may also be evident from the assumption in equation (3) on the first order approximation, as it can be rewritten as:

$$c=(S'(x_{i+1})-I(x_{i+1}))-(S'(x_i)-I(x_i)).$$

Under the first order approximation, the delta image may be approximated linearly. For the exemplary curve I shown in FIG. 3 wherein $I(a)=I(b)$ and $LS(a)=LS(b)$, it can be concluded under the delta interpolation that:

$$LS(b)-I(b)=LS(a)-I(a). \quad (9)$$

Further, as $S'(x)=LS(a)=LS(b)$ for values of x between a and b as shown earlier, equation (9) may be rewritten as:

$$S'(x)=I(x)+LS(b)-I(b). \quad (10)$$

As shown in equation (10), the reconstructed solution S' from delta interpolation adds a constant term, $LS(b)-I(b)$, to the original high resolution curve $I(x)$. Hence, the delta image may preserve any smooth changes in the original high resolution image, instead of a null solution as in other interpolation methods.

Figure 4:
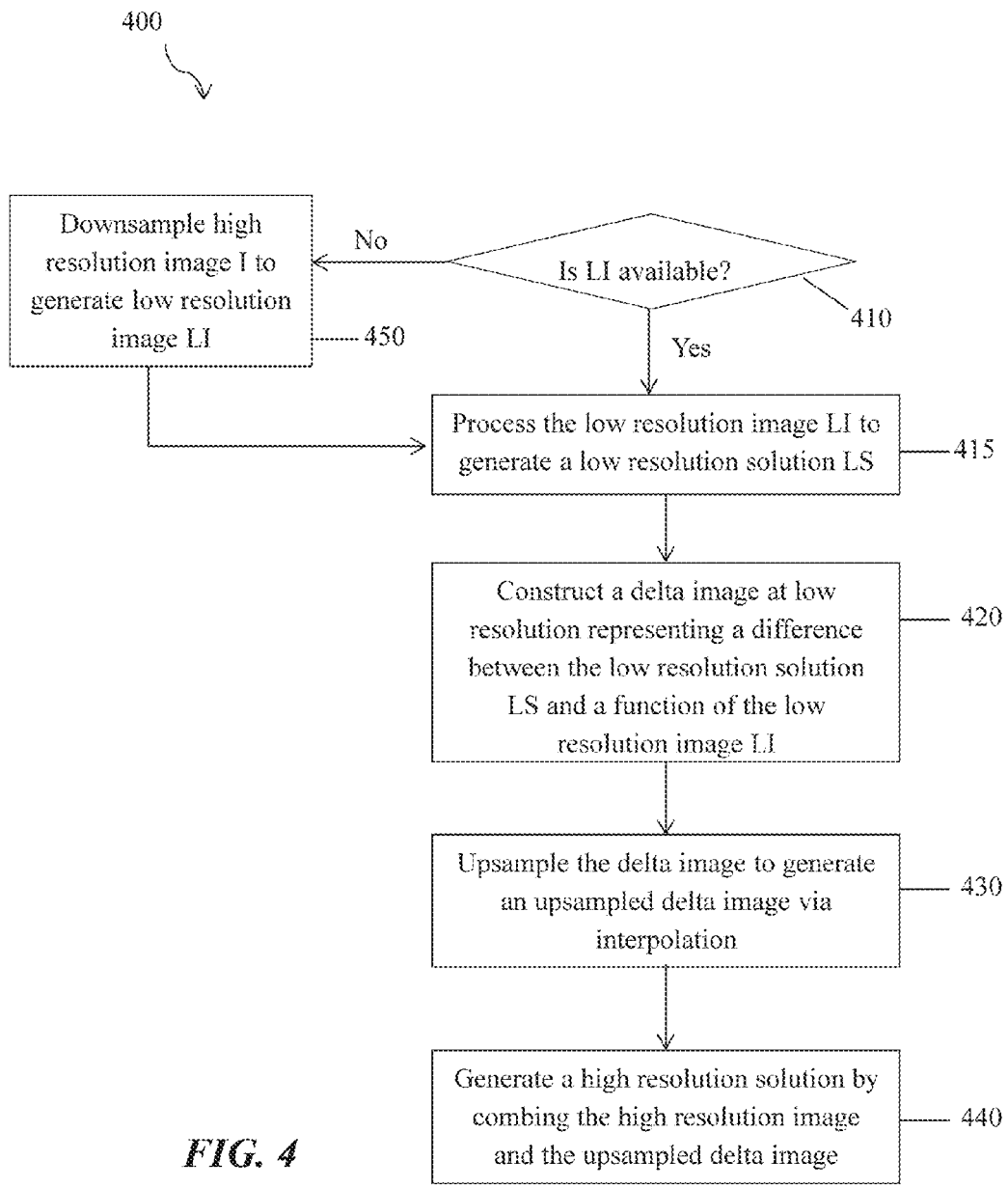
FIG. 4 is a flowchart of an embodiment of a method for reconstructing a high resolution solution with delta interpolation.

FIG. 4 is a flowchart of an embodiment of a method 400 for reconstructing a high resolution solution with delta interpolation. The method 400 operates on input with a high resolution image I, a low resolution solution LS and produces a reconstructed high resolution solution S'. At step 410, the method 400 checks if a lower resolution image is available. If not, at step 450, it first downsamples the high resolution image I to generate a low resolution image LI. Otherwise, at step 415, the method 400 may process the low resolution image LI to generate a low resolution solution LS. Any suitable image processing techniques such as color enhancement, in-depth mapping, etc., and combinations thereof may be used during the image processing.

At step 420, the method 400 constructs a delta image at low resolution LD by subtracting a function of the low resolution image LI from the low resolution solution LS. The function d may be any suitable function depending on the image processing in step 415. For example, the function d may be designed as an identity function (i.e., d(I)=I) for color enhancement. For another example, the function d and algorithm design on applications of the delta interpolation may be designed differently for other imaging solution problems, such as depth image upsampling, colorization, etc. In yet another exemplary case, if one sets the function d=0, then LD=LS, and the delta interpolation becomes a traditional interpolation as formulated in Equation (2). Next at step 430, the method 400 interpolates the low resolution delta image LD to HD at the high resolution. Next at step 440, the method 400 derives the reconstructed solution S' by adding the high resolution delta image HD to the original high resolution image I. The interpolation in step 430 may be any interpolation methods such as nearest neighbor, bilinear, bicubic, directional, bilateral, etc.

It should be understood that images may be referred to by different names sometimes. For instance, a high resolution image may sometimes be referred to as an original resolution image. Depending on whether the method 400 starts from a low resolution image or a high resolution image, the images may be referred to by different terms. For instance, the low resolution image may be a first image at a first resolution. The first image may be processed to generate a first solved image at the first resolution. Next, a difference between the first solved image and a function of the first image may be determined, and a delta image representing the difference may be constructed. Next, a second solved image at a second resolution higher than the first resolution may be generated based at least in part on the difference between the first solved image and the function of the first image. Alternatively, if the first image is unavailable at the beginning of the process, prior to processing the first image, a second image (a high resolution image) at the second resolution may be downsampled to generate the first image. Further, the delta image may be upsampled to generate an upsampled delta image at the second resolution. The second solved image may be generated by combining the upsampled delta image and the second image.

Interpolation approaches may assume a smoothness condition on a signal to be interpolated. The smoother the signal is, the better the interpolation result may be. The delta interpolation disclosed herein may take this assumption further. For an image I, it may be assumed that its imaging solution S resides in a space with a smoothness order of C. If one can find a function d, where the output of d(I) also resides in the space with a smoothness order of C, then the difference between them may likely sit in a space with a smoothness order of C+1, which comes from the intuition of finite difference.

One existing approach known as an exposure map, which is the ratio between an image solution and an image, was proposed for the application of HDR tone mapping. For the application of HDR tone mapping, the exposure map with a value smaller than one may work. However, for other applications such as color enhancement when the exposure map value may be larger than one, it may create visual artifacts. From the algorithm point of view, the exposure map approach is different from the delta image-based interpolation presented herein. The delta interpolation is motivated by a first order linear approximation, and the delta interpolation may preserve fine details at the original resolution to a large extent, due to the fact that it operates in a difference space (delta image) instead of a ratio between images.

In an embodiment, the delta interpolation algorithm disclosed herein may be applied to the imaging solution problem of color enhancement. Visual perception model based color enhancement algorithms have gained tremendous success and popularity recently. Some of the algorithms such as Retinex based algorithms and Automatic Color Enhancement (ACE) algorithms have demonstrated exceptional visual quality enhancement. However, the high computational cost may limit their usage on constrained devices such as smartphones which has limited CPUs and power. To enable color enhancement processing in real-time on these constrained devices, the image is downsampled to a low resolution, then the low resolution solution is upsampled via a delta interpolation. Due to the nature of color enhancement, the function d may be designed as an identity function (i.e., d(I)=I).

Figure 5:
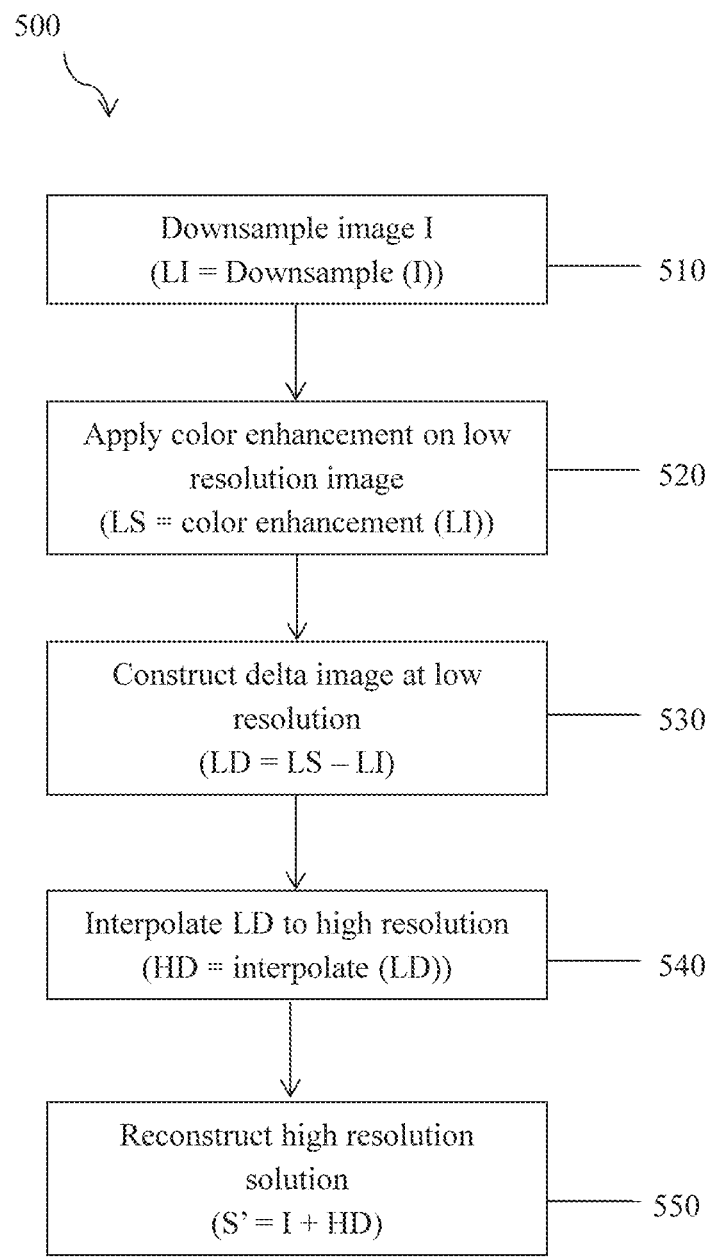
FIG. 5 is a flowchart of an embodiment of a method for color enhancement with delta interpolation.

FIG. 5 is a flowchart of an embodiment of a method 500 for color enhancement with delta interpolation. At step 510, the method 500 downsamples an original high resolution image I to a low resolution LI (e.g. less than 1 megapixel). Next at step 520, the method 500 applies the color enhancement algorithm on the low resolution image LI and produces a low resolution solution LS. Then, at step 530, the method 500 constructs a low resolution delta image LD by subtracting the low resolution image LI from the low resolution solution LS. At step 540, the method 500 may upsample the low resolution delta image to the original high resolution via interpolation, thereby producing a high resolution delta image HD. At step 550, the method 500 derives a reconstructed high resolution solution S' by adding the high resolution delta image HD to the original high resolution image I.

The interpolation in step 540 may be any interpolation method(s) such as directional interpolation. As opposed to traditional directional interpolation, which may be employed to estimate a high resolution gradient from a low resolution gradient, the knowledge of the high resolution image is available in the present disclosure. Thus, a gradient of the high resolution image may be calculated and then used for the gradient of the high resolution solution. This may be more accurate and also computationally faster than traditional directional interpolation for the application of color enhancement. In an embodiment, the directional interpolation in step 540 may be implemented using several sub-steps. First, the method 500 may calculate the gradient of the original resolution image. Second, the method 500 may apply an in-block interpolation with the gradient of the original resolution image. Third, the method 500 may apply an on-block interpolation with the gradient of the original resolution image.

The delta interpolation in the color enhancement application in FIG. 5 may be edge preserving. Representing a difference between the low resolution image before and after color enhancement, the delta image LD may mostly comprise low frequency content. After interpolation, the interpolated delta image may imply that the reconstructed solution S may have similar high frequency content as the original resolution image I. Experimental results indicates that the delta interpolation algorithm for color enhancement preserves fine details and subtle changes much better than existing upsampling imaging solution algorithms.

To validate the performance of the delta interpolation on color enhancement, experiments were conducted to compare delta interpolation results with existing upsampling imaging solution algorithms including the joint bilateral upsampling algorithm. Comparisons were made using the delta interpolation solution and three other upsampling imaging solutions, which were bicubic interpolation-based, joint bilateral upsampling, and exposure map-based, for color enhancement applications. The exposure map-based method may be considered a variant of the joint bilateral upsampling algorithm, where the bilateral upsampling is on the exposure map (which is the ratio between an image solution and an image) instead of the image solution (which is the color enhanced low resolution image).

FIGS. 6A-6F illustrate thumbnails of some exemplary test images. The test images are 24-bit RGB color images, with image sizes ranging from 2000×1312 to 2368×4160. The tests were performed on a Lenovo T420 laptop with Windows 7 operating system (OS), Intel Core i5-2520M 2.5 gigahertz (GHz) CPU, and 4 GB RAM. Peak-signal-to-noise ratio (PSNR) was used for objective visual quality measurement due to its popularity. The PSNR between the upsampling imaging solution S and the original solution S of four different algorithms are listed in Table 1. Specifically, PSNR numbers and execution running time for each of the six exemplary images shown in FIGS. 6A-6F are listed.

TABLE 1

| Objective results among four upsampling imaging solution algorithms | | | | | | | | |
|---|---|---|---|---|---|---|---|---|
| | Flower | Bike | Woman | Wall | Man | House | Average | Time |
| Size | 2368 × 141 | 2048 × 125 | 2048 × 125 | 3072 × 117 | 2592 × 119 | 2000 × 13 | | |
| Scale | 4 | 4 | 4 | 4 | 4 | 2 | | |
| Bicubic | 26.87 db | 19.63 db | 22.73 db | 22.38 db | 30.53 db | 38.37 db | 26.75 db | 0.772 s |
| Bilateral | 29.52 db | 21.36 db | 23.65 db | 23.92 db | 32.44 db | 37.33 db | 28.04 db | 1.186 s |
| Exposure | 29.65 db | 24.37 db | 33.46 db | 28.94 db | 35.20 db | 36.60 db | 31.37 db | 1.187 s |
| Delta | 34.07 db | 26.77 db | 34.04 db | 30.21 db | 36.28 db | 42.48 db | 33.98 db | 0.774 s |

In Table 1, the second row lists original resolution image sizes, and the third row lists downsample scaling factors. The fourth to seventh rows are PSNR numbers for the bicubic interpolation, joint bilateral upsampling, exposure map, and delta interpolation based upsampling imaging solutions, respectively. The eighth column lists average PSNR for the six exemplary images. The last column of Table 1 lists execution running times. From Table 1, it can be seen that the delta interpolation approach is more than 2 decibel (dB) better than the other three algorithms, with the exposure map-based algorithm coming second, joint bilateral upsampling the third, and bicubic interpolation the last. On average, the running time of the upsampling approaches are on the order of one second, while the running time of the original solution S is about 15.21 seconds (not in Table 1). Thus the speed improvement of all four upsampling imaging solution algorithms is one order of magnitude.

Figure 6A:
FIGS. 6A-6F illustrate thumbnails of exemplary test images obtained using delta interpolation disclosed herein and several traditional methods.
Figure 6B:
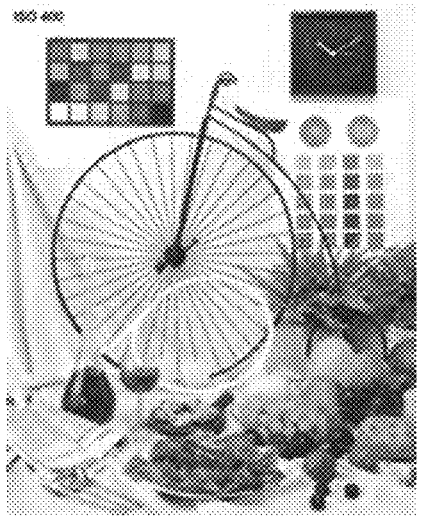
Figure 6C:
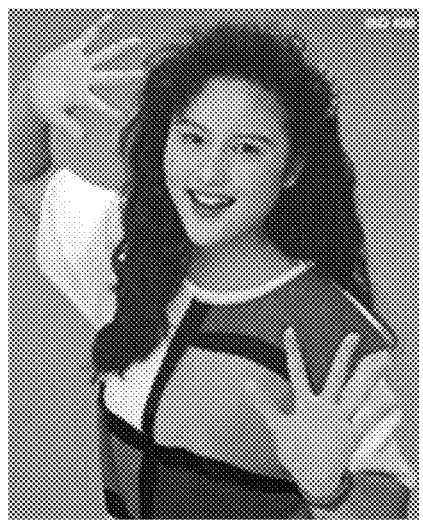
Figure 6D:
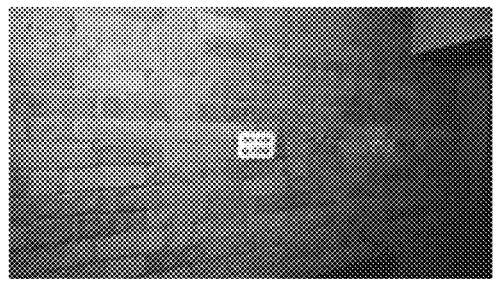
Figure 6E:
Figure 6F:
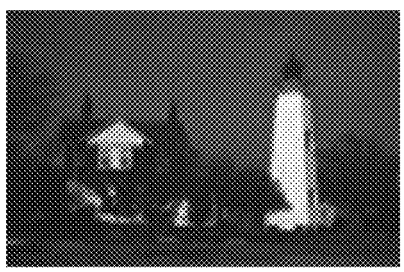

A subjective visual quality comparison among these four upsampling imaging solution algorithms for color enhancement is illustrated in FIGS. 7A-7F. In the interest of conciseness, the flower image corresponding to FIG. 6A is used as an example. A block region in an upsampled result of the flow image, as shown in FIG. 7A, is zoomed in to illustrate the visual quality of four upsampling imaging solution algorithms, along with a ground truth (the original resolution solution S) shown in FIG. 7F. As expected, the bicubic interpolation shown in FIG. 7B is the worst among the four upsampling imaging solution algorithms, as it fully ignores the knowledge of the original resolution image. The joint bilateral upsampling algorithm shown in FIG. 7C may preserve edge information fairly well, yet it smoothes out texture and fine details. Though the exposure map method shown in FIG. 7D gives a higher PSNR than the joint bilateral upsampling algorithm, the exposure map upsampled solution contains lots of white salt noise. Since upsampling is operated on a ratio, which may bring pixel values out of their dynamic range, therefore clipping at boundaries.

The disclosed delta interpolation shown in FIG. 7E preserves the edge information very well. In addition, the delta interpolation keeps the texture and fine details to a large extent. Although the flower image is shown here as an example, test results indicate that the visual quality of other test images indicate the same phenomena as the flower image: the performance of bicubic interpolation is at the bottom, the joint bilateral upsampling presents a better visual appearance than the exposure map-based, and the disclosed delta algorithm gives the best visual quality among these four upsampling imaging solution algorithms. The delta interpolation algorithm may preserve edge information well, and keep texture and fine details to a large extent.

Figure 8:
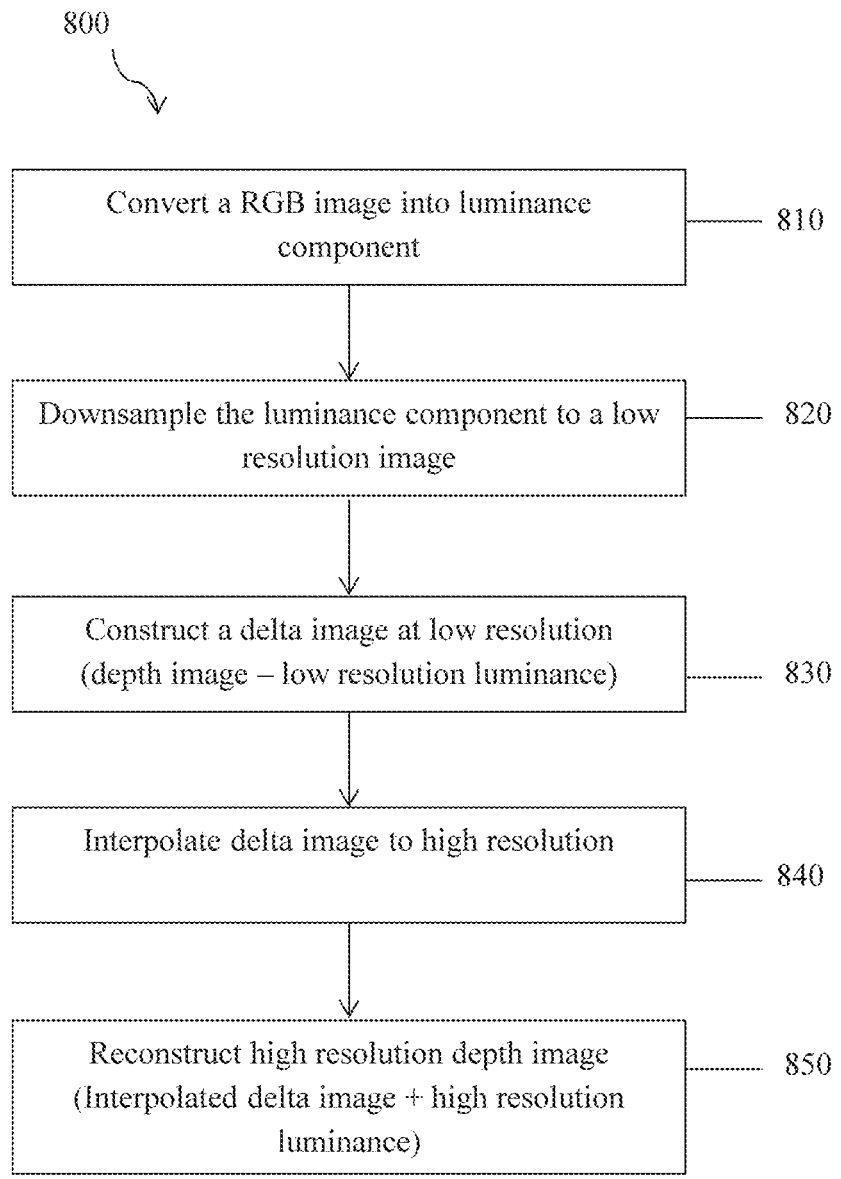
FIG. 8 is a flowchart of an embodiment of a method for reconstructing a high resolution depth image solution with delta interpolation.

FIG. 8 is a flowchart of an embodiment of a method 800 for depth image solution with delta interpolation. In this exemplary application, a low resolution depth image and a high resolution RGB or other color space image are available, and the goal is to reconstruct a high resolution depth image. At step 810, the method 800 converts a RGB image into luminance component (or it may be other channel component such as intensity, etc.). In other words, the image may be converted from a RGB color space to a luminance and chrominance color space. At step 820, the method 800 downsamples the luminance to a low resolution (chrominance can be processed similarly). At step 830, the method 800 computes a delta image by subtracting the low resolution luminance from the depth image. At step 840, the method 800 interpolates the delta image to a high resolution. At step 850, the method 800 reconstructs the high resolution depth image by adding the interpolated delta image to the high resolution luminance component.

Figure 9:
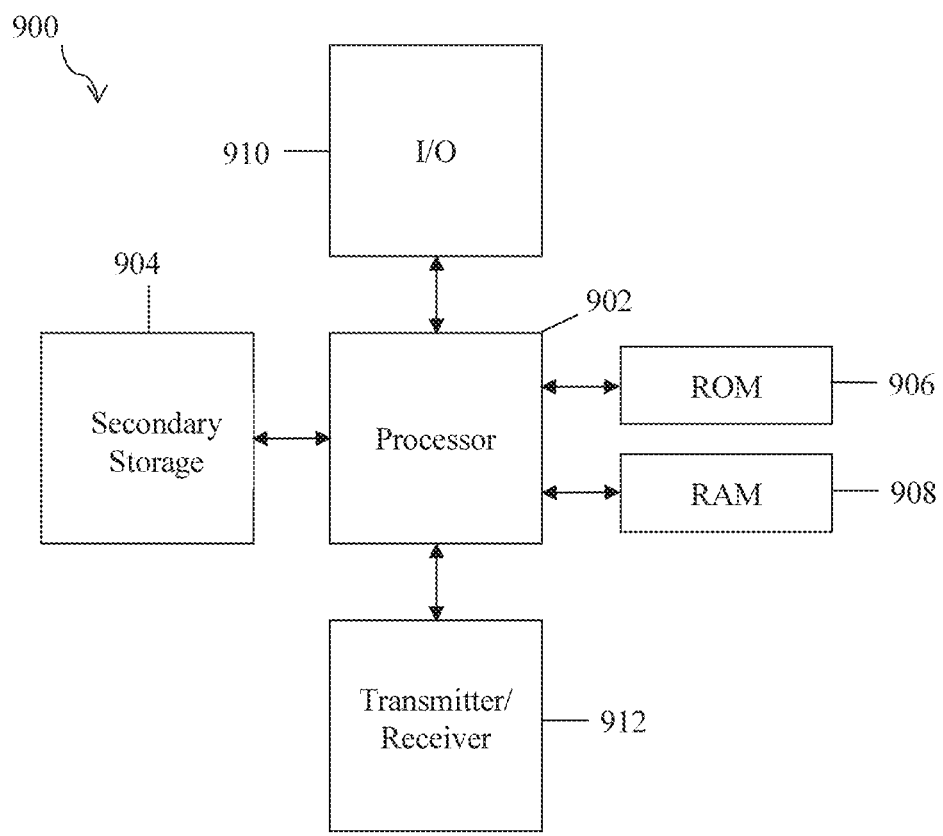
FIG. 9 is a schematic diagram of an embodiment of a computer system.

The schemes described above may be implemented on a network component, such as a computer or network component with sufficient processing power, memory resources, and network throughput capability to handle the necessary workload placed upon it. FIG. 9 illustrates an embodiment of a computer system or network node 900 suitable for implementing one or more embodiments of the systems disclosed herein, such as the mobile device 100 described above. The denoising filters disclosed herein may be implemented by other types of computer systems or electronic devices, such as a desktop computer or a server.

The computer system 900 includes a processor 902 that is in communication with memory devices including secondary storage 904, ROM 906, RAM 908, input/output (I/O) devices 910, and transmitter/receiver (transceiver) 912. Although illustrated as a single processor, the processor 902 is not so limited and may comprise multiple processors. The processor 902 may be implemented as one or more CPU chips, cores (e.g., a multi-core processor), field-programmable gate arrays (FPGAs), application specific integrated circuits (ASICs), and/or digital signal processors (DSPs). The processor 902 may be configured to implement at least part of any of the schemes or methods described herein, including the process 200, the methods 400, 500, and 800. The processor 902 may be implemented using hardware or a combination of hardware and software.

The secondary storage 904 is typically comprised of one or more disk drives or tape drives and is used for non-volatile storage of data and as an over-flow data storage device if the RAM 908 is not large enough to hold all working data. The secondary storage 904 may be used to store programs that are loaded into the RAM 908 when such programs are selected for execution. The ROM 906 is used to store instructions and perhaps data that are read during program execution. The ROM 906 is a non-volatile memory device that typically has a small memory capacity relative to the larger memory capacity of the secondary storage 904. The RAM 908 is used to store volatile data and perhaps to store instructions. Access to both the ROM 906 and the RAM 908 is typically faster than to the secondary storage 904.

The transmitter/receiver 912 (sometimes referred to as a transceiver) may serve as an output and/or input (I/O) device of the computer system 900. For example, if the transmitter/receiver 912 is acting as a transmitter, it may transmit data out of the computer system 900. If the transmitter/receiver 912 is acting as a receiver, it may receive data into the computer system 900. Further, the transmitter/receiver 912 may include one or more optical transmitters, one or more optical receivers, one or more electrical transmitters, and/or one or more electrical receivers. The transmitter/receiver 912 may take the form of modems, modem banks, Ethernet cards, universal serial bus (USB) interface cards, serial interfaces, token ring cards, fiber distributed data interface (FDDI) cards, and/or other well-known network devices. The transmitter/receiver 912 may enable the processor 902 to communicate with an Internet or one or more Intranets. The I/O devices 910 may be optional or may be detachable from the rest of the computer system 900. The I/O devices 910 may include a display such as a touch screen or a touch sensitive display. The I/O devices 910 may also include one or more keyboards, mice, or track balls, or other well-known input devices.

It is understood that by programming and/or loading executable instructions onto the computer system 900, at least one of the processor 902, the secondary storage 904, the RAM 908, and the ROM 906 are changed, transforming the computer system 900 in part into a particular machine or apparatus (e.g. a mobile device such as the mobile device 100 having the functionality taught by the present disclosure). The executable instructions may be stored on the secondary storage 904, the ROM 906, and/or the RAM 908 and loaded into the processor 902 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose CPU inside a computer system) in a computer system (e.g., the mobile device 100) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means +/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An apparatus comprising one or more processors configured to:
   process a first image at a first resolution to generate a first solved image at the first resolution;
   determine a difference between the first solved image and a function of the first image;
   generate a second solved image at a second resolution higher than the first resolution based at least in part on the difference between the first solved image and the function of the first image;
   downsample a second image at the second resolution to generate the first image prior to processing the first image; and
   upsample a delta image representing the difference between the first solved image and the function of the first image to generate an upsampled delta image at the second resolution, and wherein the second solved image is generated by combining the upsampled delta image and the second image,
   wherein the second image comprises a pixel value denoted as I(x), where x is a pixel coordinate between and including coordinates a and b, wherein the second solved image comprises a corresponding pixel value S'(x) at coordinate x, wherein the first solved image comprises pixel values LS(a) and LS(b), and wherein a difference between S'(x) and I(x) is determined by the following equation:

$$S'(x) - I(x) = \frac{x-a}{b-a}(LS(b) - I(b)) + \frac{b-x}{b-a}(LS(a) - I(a)).$$

2. The apparatus of claim 1, wherein the first image is processed by color enhancement processing to generate the first solved image, and wherein the function of the first image comprises an identity function that does not change the first image.

3. The apparatus of claim 1, wherein the function of the first image is a linear function of the first image, wherein the apparatus further comprises a digital camera, and wherein the digital camera is coupled to the one or more processors and is configured to capture the second image prior to downsampling the second image.

4. The apparatus of claim 1, wherein the upsampled delta image is generated via directional interpolation based at least in part on a gradient of the second image.

5. The apparatus of claim 4, wherein the upsampled delta image is generated via directional interpolation by:

calculating the gradient of the second image;
applying an in-block interpolation with the gradient of the second image; and
applying an on-block interpolation with the gradient of the second image.

6. The apparatus of claim 1, wherein the one or more processors are further configured to convert the second image from a Red Green Blue (RGB) color space to a luminance and chrominance color space prior to downsampling the second image, and wherein luminance components of the second image are downsampled.

7. A method of image processing comprising:
   processing a low resolution image to generate a low resolution solution;
   generating a delta image based on a difference between the low resolution solution and a function of the low resolution image;
   generating a high resolution solution based at least in part on the delta image;
   downsampling a high resolution image to generate the low resolution image prior to processing the low resolution image; and
   upsampling the delta image to generate an upsampled delta image prior to generating the high resolution solution,
   wherein the high resolution solution is generated by combining the upsampled delta image and the high resolution image,
   wherein the high resolution image comprises a pixel value denoted as I(x), where x is a pixel coordinate between and including coordinate a and b, wherein the high resolution solution comprises a corresponding pixel value S'(x) at coordinate x, wherein the low resolution solution comprises pixel values LS(a) and LS(b), and wherein a difference between S'(x) and I(x) is determined by the following equation:

$$S'(x) - I(x) = \frac{x-a}{b-a}(LS(b) - I(b)) + \frac{b-x}{b-a}(LS(a) - I(a)).$$

8. The method of claim 7, wherein the low resolution image is processed by color enhancement processing to generate the low resolution solution, and wherein the function of the low resolution image comprises an identity function that does not change the low resolution image.

9. The method of claim 7, wherein the method is implemented by a mobile device, and wherein the function of the low resolution image is a linear function of the low resolution image.

10. The method of claim 7, wherein the upsampled delta image is generated via directional interpolation based at least in part on a gradient of the high resolution image.

11. The method of claim 10, wherein generating the upsampled delta image via directional interpolation comprises:
    calculating the gradient of the high resolution image;
    applying an in-block interpolation with the gradient of the high resolution image; and
    applying an on-block interpolation with the gradient of the high resolution image.

12. A computer program product comprising computer executable instructions stored on a non-transitory computer readable medium such that when executed by a processor cause an image processing device to:

downsample an original resolution image to generate a low resolution image having a resolution lower than that of the original resolution image;

process the low resolution image to generate a low resolution solution;

construct a delta image that represents a difference between the low resolution solution and a function of the low resolution image;

upsample the delta image to generate an upsampled delta image via interpolation; and generate an original resolution solution by combining the original resolution image and the upsampled delta image, wherein the original resolution image comprises a pixel value denoted as I(x), where x is a pixel coordinate between and including coordinates a and b, wherein the original resolution solution comprises a corresponding pixel value S'(x) at coordinate x, wherein the low resolution solution comprises pixel values LS(a) and LS(b), and wherein a difference between S'(x) and I(x) is determined by the following equation:

$$S'(x) - I(x) = \frac{x-a}{b-a}(LS(b) - I(b)) + \frac{b-x}{b-a}(LS(a) - I(a)).$$

13. The computer program product of claim 12, wherein the low resolution image is processed by color enhancement processing to generate the low resolution solution, and wherein the function of the low resolution image comprises an identity function that does not change the low resolution image.

14. The computer program product of claim 12, wherein the image processing device is a mobile device, and wherein the function of the low resolution image is a linear function of the low resolution image.

15. The computer program product of claim 12, wherein upsampling the delta image to generate the upsampled delta image via interpolation comprises:
   calculating the gradient of the original resolution image;
   applying an in-block interpolation with the gradient of the original resolution image; and
   applying an on-block interpolation with the gradient of the original resolution image.

\* \* \* \* \*